United States Patent [19]

Yamazaki

[11] Patent Number: 4,972,838
[45] Date of Patent: Nov. 27, 1990

[54] ULTRASONIC DIAGNOSTIC APPARATUS
[75] Inventor: Nobuo Yamazaki, Ootawara, Japan
[73] Assignee: Kabushiki Kaisha Toshiba, Kawasaki, Japan
[21] Appl. No.: 378,696
[22] Filed: Jul. 11, 1989
[30] Foreign Application Priority Data Jul. 13, 1988 [JP] Japan .................................. 63-174425

[51] Int. Cl.⁵ ................................................ A61B 8/00
[52] U.S. Cl. ............................ 128/661.09; 128/660.05
[58] Field of Search ......................... 128/661.07–661.1, 128/660.05; 73/861.25

[56] References Cited

U.S. PATENT DOCUMENTS

| | | | |
|---|---|---|---|
| 4,398,540 | 8/1983 | Takemura et al. | 128/661.09 X |
| 4,416,286 | 11/1983 | Iinuma et al. | 128/661.09 X |
| 4,501,277 | 2/1985 | Hongo | 128/661.09 X |
| 4,787,395 | 11/1988 | Yamashina et al. | 128/661.09 |
| 4,790,322 | 12/1988 | Iinuma | 128/661.1 |
| 4,817,619 | 4/1989 | Sugiyama et al. | 128/661.09 |
| 4,873,985 | 10/1989 | Nakajima | 128/661.1 X |

Primary Examiner—Francis Jaworski
Attorney, Agent, or Firm—Finnegan, Henderson, Farabow, Garrett & Dunner

[57] ABSTRACT

The present invention relates to a technique for setting a sample point in a pulse Doppler scan in a linear scan type ultrasonic diagnostic apparatus. A transmitting-/receiving system for transmitting/receiving a linear scan of ultrasonic beams to/from a subject includes a linear scan probe, a pulser, a preamplifier, a receiving delay line and a summing circuit, as well as a sample point setter and a deflection angle setting circuit. The ultrasonic diagnostic apparatus includes a control system for fixing the initially set position of the sample point in the subject, when the deflection angle is reset by the deflection angle setting circuit, and for changing a set value of the sample point setting circuit so that the fixed position of the sample point coincides with a sample point of an ultrasonic beam to be propagated based on the reset deflection angle, and an image system having at least a D-mode processor for frequency-analyzing a received signal corresponding to the sample point to find a Doppler deviation frequency fd, and calculating bloodstream velocity data of the subject from the found doppler deviation frequency fd.

18 Claims, 10 Drawing Sheets

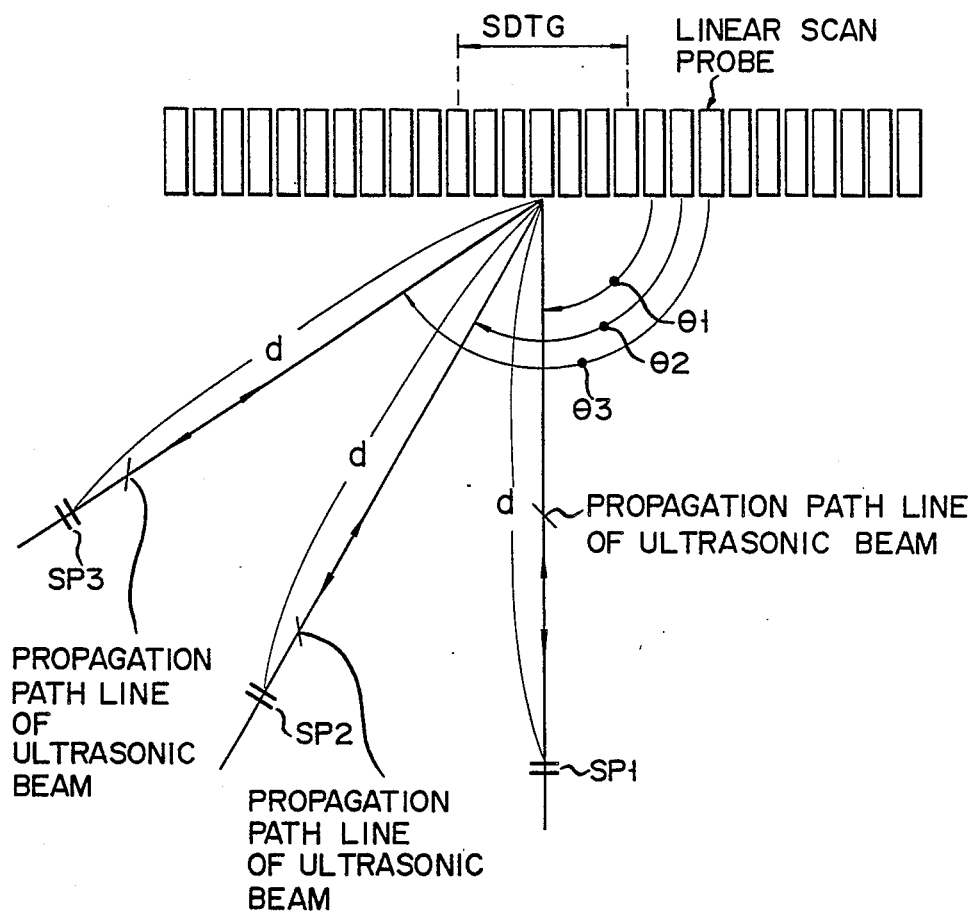
F I G. 1

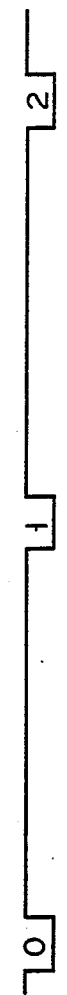
FIG. 7A RATE PULSE
FIG. 7B RASTER ADDRESS
FIG. 7C SAMPLING TIME FOR B-MODE
FIG. 7D INPUTTING TIME FOR CFM PROCESSING
FIG. 7E OUTPUTTING TIME FOR CFM PROCESSING
FIG. 7F SAMPLING TIME FOR PWD-MODE

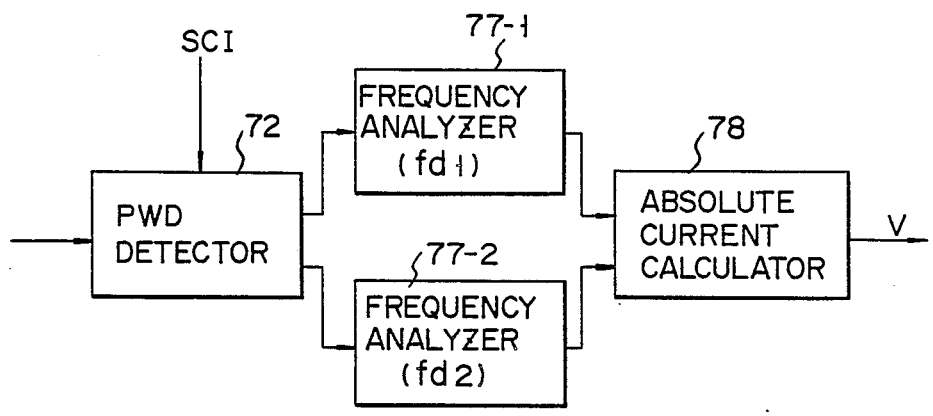
F I G. 11A
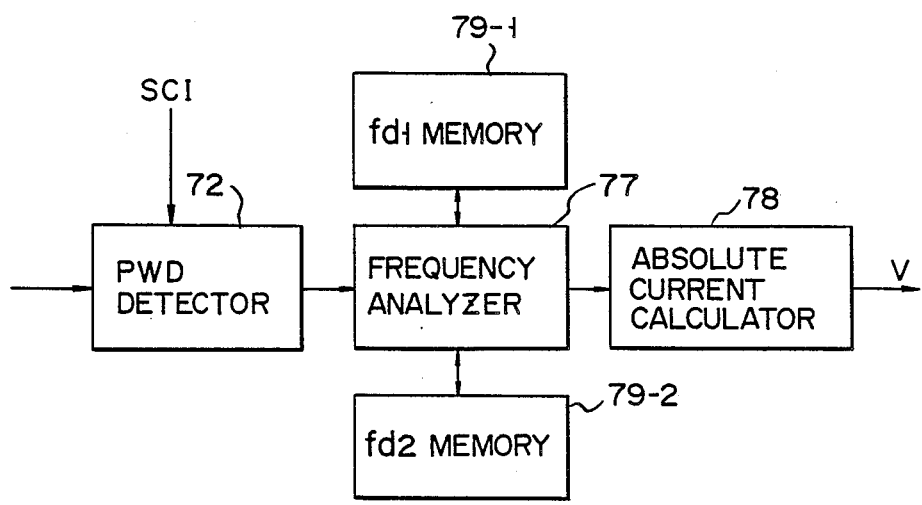
F I G. 11B

ULTRASONIC DIAGNOSTIC APPARATUS

BACKGROUND OF THE INVENTION

1. Field of the Invention

The present invention relates to an ultrasonic diagnostic apparatus wherein ultrasonic images such as an M-mode display image (motion image), a B-mode display image (tomographic image), a D-mode (a PWD-mode, a CWD-mode) display image (bloodstream velocity image) or a DF-mode (a BDF-mode, a MDF-mode) display image (CFM image: Color Flow Mapping Image) are obtained by causing ultrasonic beams to scan a living body for the purpose of diagnosis.

2. Description of the Related Art

This type of ultrasonic diagnostic apparatus is used for the diagnosis of a circulatory system, for example, a heart. In this case, a doctor obtains a B-mode display image as anatomical data of the heart, obtains an M-mode display image as functional data of the heart, or obtains a D-mode (a PWD-mode, a CWD-mode) display image or a DF-mode (a BDF-mode, a MDF-mode) display image as data of bloodstream in the heart.

In general, the B-mode display image and the D-mode display image are simultaneously obtained and observed for effective diagnosis of the heart. The D-mode display image is obtained by using the Doppler effect. In this case, a moving object is in general a flow of blood cells. Thus, in order to cause the Doppler effect, it is necessary that the direction of the bloodstream is not at right angles with the ultrasonic beams.

Since the blood cells flow along the surface of the living body, a linear scan wherein ultrasonic beams are transmitted/received in a direction perpendicular to the surface of the body is not suitable. Rather, a sector scan wherein ultrasonic beams are transmitted/received in a direction non-perpendicular to the surface of the body is suitable.

However, the B-mode image obtained by the sector scan has a sectional shape, and a visual field near a probe is very narrow. Thus, this B-mode image is observed with some difficulty, compared to a rectangular image such as a B-mode obtained by a linear scan or a trapezoidal image obtained by a trapezoidal scan.

SUMMARY OF THE INVENTION

The object of the present invention is to provide an ultrasonic diagnostic apparatus which enables a circulatory organ to be easily observed. This object can be realized by an ultrasonic diagnostic apparatus comprising:

a transmitting/receiving means for transmitting/receiving a linear/scan of ultrasonic beams to/from a subject through a linear scan probe;

sample point setting means for setting a sample point at a desired position in a propagation path line for the ultrasonic beam;

deflection angle setting means for setting a deflection angle of the ultrasonic beam to a desired value;

changing means for fixing the initially set position of the sample point in the subject, when the deflection angle is reset by the deflection angle setting means, and for changing a set value of the sample point setting means so that the fixed position of the sample point coincides with a sample point of an ultrasonic beam to be propagated based on the reset deflection angle; and an imaging means having at least a D-mode processor for frequency-analyzing a received signal corresponding to the sample point to find a Doppler deviation frequency fd, and calculating bloodstream velocity data of the subject from the found Doppler deviation frequency fd.

The object of the present invention can also be achieved by an ultrasonic diagnostic apparatus comprising:

a transmitting/receiving means for transmitting/receiving a linear/scan of ultrasonic beams to/from a subject through a linear scan probe and for carrying out a B-mode scan, an M-mode scan, a D-mode scan, a DF-mode scan, a D-mode/B-mode scan, a D-mode/M-mode scan, and a D-mode/DF-mode scan;

sample point setting means for setting a sample point at a desired position in a propagation path line for the ultrasonic beam;

deflection angle setting means for setting a deflection angle of the ultrasonic beam to a desired value, wherein the deflection angle setting means is operated by an operator to change the deflection angle of the ultrasonic beam, and, when an equivalent sound source of the ultrasonic beam has reached one end of the probe, the equivalent sound source is returned to the other end of the probe;

changing means for fixing the initially set position of the sample point in the subject, when the deflection angle is reset by the deflection angle setting means, and for changing a set value of the sample point setting means so that the fixed position of the sample point coincides with a sample point of an ultrasonic beam to be propagated based on the reset deflection angle; and an imaging means having at least a D-mode processor for frequency-analyzing a received signal corresponding to the sample point to find a Doppler deviation frequency fd, and calculating bloodstream velocity data of the subject from the found Doppler deviation frequency fd.

The object of the present invention can also be achieved by an ultrasonic diagnostic apparatus comprising:

a transmitting/receiving means for transmitting/receiving a linear/scan of ultrasonic beams to/from a subject through a linear scan probe and for carrying out a B-mode scan, an M-mode scan, a D-mode scan, a DF-mode scan, a D-mode/B-mode scan, a D-mode/M-mode scan, and a D-mode/DF-mode scan;

sample point setting means for setting a sample point at a desired position in a propagation path line for said ultrasonic beam;

deflection angle setting means for setting a deflection angle of the ultrasonic beam to a desired value, wherein the deflection angle setting means is operated by an operator to change the deflection angle of the ultrasonic beam, and, when an equivalent sound source of the ultrasonic beam has reached one end of the probe, the equivalent sound source is returned to the other end of the probe;

changing means for fixing the initially set position of the sample point in the subject, when the deflection angle is reset by the deflection angle setting means, and for changing a set value of the sample point setting means so that the fixed position of the sample point coincides with a sample point of an ultrasonic beam to be propagated based on the reset deflection angle; and an imaging means including a digital scan converter, having a B-mode processor, an M-mode processor, a D-mode processor, and a DF-mode processor, for synthesizing ultrasonic images output from the B-mode processor, M-mode processor, D-mode processor, and DF-mode processor and converting the resulting synthesized image to a standard television image, said D-mode processor comprising:

a frequency analyzer for frequency-analyzing a receiving signal of a ultrasonic beam having a first deflection angle, which is obtained at the sample point fixed in the subject, thereby to obtain a first Doppler deviation frequency fd1, and for frequency-analyzing a received signal of an ultrasonic beam having a second deflection angle, which is obtained at the sample point fixed in the subject, thereby to obtain a second Doppler deviation frequency fd2, first memory means for storing the first Doppler deviation frequency fd1 obtained by the frequency analyzer, second memory means for storing the second Doppler deviation frequency fd2 obtained by the frequency analyzer, and a signal processing section having at least calculating means for calculating an absolute bloodstream velocity data on the basis of the first Doppler deviation frequency fd1 stored in the first memory means and the second Doppler deviation frequency fd2 stored in the second memory means.

BRIEF DESCRIPTION OF THE DRAWINGS

FIG. 1 shows the positional changes of sampling points when the deflection angle of ultrasonic beams in a linear scan is varied;

FIGS. 6A to 6C show examples of combination of the deflection angle of B-mode scan ultrasonic beams and the deflection angle of D-mode scan ultrasonic beams, wherein FIG. 6A shows the case where the angle of the B-mode scan ultrasonic beams differs from that of the D-mode scan ultrasonic beams and the angle of the B-mode scan ultrasonic beams is 90° while the angle of the D-mode scan ultrasonic beams is not 90°, FIG. 6B shows the case where the angle of the B-mode scan ultrasonic beams is equal to that of the D-mode scan ultrasonic beams and both angles are not 90°, and FIG. 6C shows the case where the angle of the B-mode scan ultrasonic beams differs from that of the D-mode scan ultrasonic beams and both angles are not 90°;

FIGS. 7A to 7F are timing charts showing the operation of the ultrasonic diagnostic apparatus shown in FIG. 4, wherein FIG. 7A is a timing chart of rate pulses, FIG. 7B is a timing chart of raster addresses, FIG. 7C is a timing chart of sampling time for B-mode, FIG. 7D is a timing chart of data input for CFM operational processing (DF mode), FIG. 7E is a timing chart of data output for CFM operational processing (DF mode), and FIG. 7F is a timing chart of sampling time for PWD (Pulsed-Wave Doppler)-mode (D-mode);

FIGS. 8A to 8D show setting modes of deflection angles of ultrasonic beams in a D-mode scan, wherein FIGS. 8A and 8B show the case where the scan is limited at an end of a linear scan probe, and FIGS. 8C and 8D show the case where the scan is returned at the end portion of the linear scan probe;

FIG. 11A is a block diagram showing a first embodiment of a structure for measuring the absolute bloodstream velocity value; and FIG. 11B is a block diagram showing a second embodiment of the structure for measuring the absolute bloodstream velocity value.

DETAILED DESCRIPTION OF THE PREFERRED EMBODIMENTS

Figure 2:
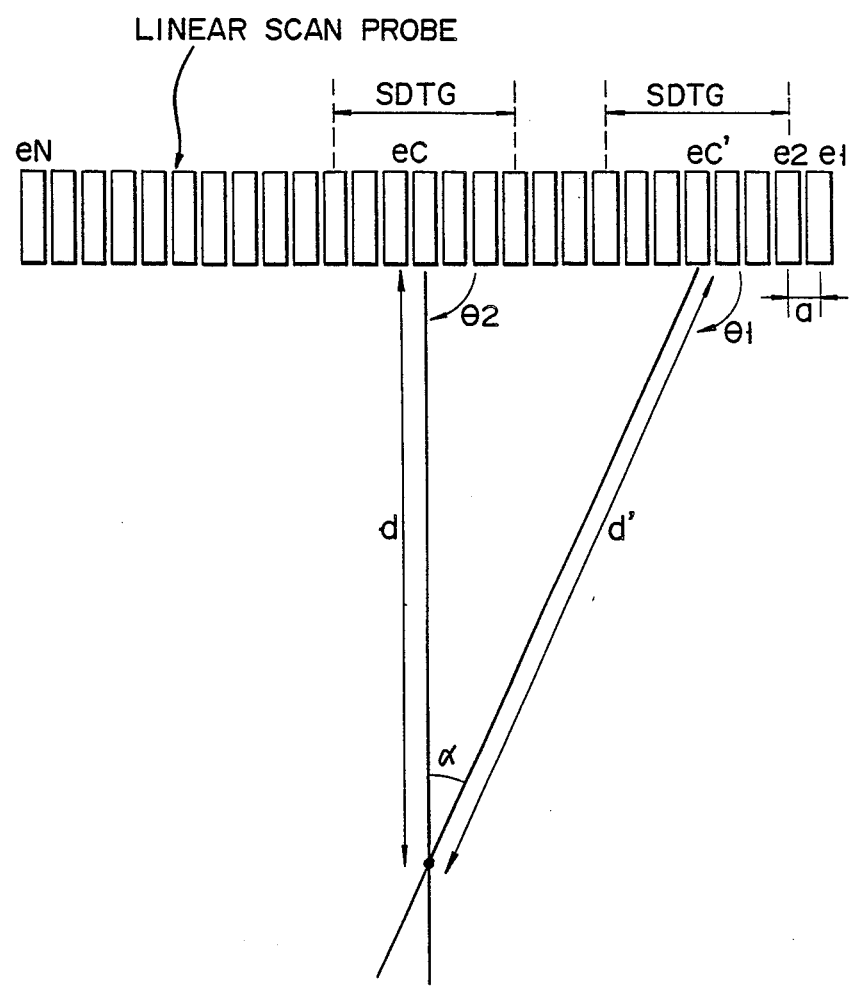
FIG. 2 shows the relationship between sample points, the deflection angle of ultrasonic beams and propagation paths in a linear scan.

Prior to a description of embodiments of the present invention, scan systems employed in an ultrasonic diagnostic apparatus of this invention will be described. Typical scan systems used in this type of ultrasonic diagnostic apparatus are a linear scan system and a sector scan system.

In the linear scan system, transmission/reception points of ultrasonic beams are linearly moved while the direction in which the ultrasonic beams are transmitted/received is fixed. In contrast, in the sector scan system, the transmission/reception points of ultrasonic beams are fixed and the direction in which the ultrasonic beams are transmitted/received is changed.

Scanning methods include mechanical ones and electric ones. As a typical example, an electric method will now be described.

Normally, the ultrasonic waves are transmitted/received from/by a plurality of ultrasonic transducers, and not a single ultrasonic transducer. A group of ultrasonic transducers for generating ultrasonic beams is hereinafter called "Simultaneous Driving Transducers Group (SDTG)".

In the linear scan system, the SDTG is linearly moved. In the sector scan system, the SDTG is fixed, and the beams transmitted from the transducers of the SDTG are subjected to phase control processing so that the directions of the beams can be changed. In the linear scan system, the transducers are not mechanically moved. Namely a given number of transducers in a probe are continuously turned on in a sequentially manner by the operation of electrical switches.

In the linear scan system, a linear scan array type ultrasonic probe comprising, for example, 256 ultrasonic transducers is employed. In the sector scan system, a sector scan array type ultrasonic probe comprising, for example 56 ultrasonic transducers is employed. In the linear scan system, the probe includes a plurality of simultaneous driving transducers groups (SDTGs), while in the sector scan system al transducers in the probe constitute a single simultaneous driving transducers group.

Display modes include an M-mode display, a B-mode display, a D-mode display, and a DF-mode display.

In the M-mode display, received ultrasonic beams, which have scanned given positions, are subjected to envelope detection, and the change of the resulting envelope detection signals with the lapse of time is displayed.

In the B-mode display, received ultrasonic beams, which have scanned a wide area two-dimensionally, are subjected to envelope detection, and a tomographic image obtained by two-dimensionally synthesizing the resulting envelope detection signals is displayed.

The D-mode display uses the Doppler effect. Generally, a moving bodies are blood cells which are flowing. More specifically, the D-mode display includes a PWD (Pulse-Wave Doppler) mode and a CWD (Continuous-Wave Doppler) mode. A bloodstream pattern at a given area can be observed by the PWD mode and a maximum bloodstream velocity can be observed by the CWD mode.

In the D-mode display, data can be obtained in the following manner. For example, in the PWD mode, ultrasonic pulse beams are propagated in a direction perpendicular to a direction in which a blood vessel runs in a living body, and a signal component corresponding to a specific position is extracted (sampled) from the received beam. The sampled signal is subjected to frequency analysis, for example, by high-speed Fourier transform, thus obtaining a bloodstream pattern. In the PWD mode, Doppler data corresponding to a specific point is obtained. In other words, one-point Doppler measurement can be performed. On the other hand, in the DF-mode, Doppler data corresponding to a number of points can be obtained. Namely, multipoint Doppler measurement can be performed.

In the DF mode display employed, for example, in a correlation system, a specific region is scanned several times, and, based on the correlation of the resulting receiving signals, a CFM image or a profile (direction of bloodstream, average flow velocity, flow velocity distribution, power in bloodstream direction, etc.) of a bloodstream is displayed by means of levels of brightness, hue and tone. Normally, the DF-mode display is combined with the M-mode display and B-mode display, and the DF-mode display in this case is called an MDF-mode display or a BDF-mode display.

As has been already described in the "Background of the Invention", in an actual apparatus, the PWD-mode display is applied to the sector scan, in consideration of the principle of Doppler effect. The reason for this is that the direction of the bloodstream need not be perpendicular to the direction of ultrasonic beams in order to utilize the Doppler effect. Since ultrasonic beams are transmitted/received slantingly in the sector scan, the PWD-mode is easily applied to the sector scan. However, a B-mode display image obtained by the sector scan has a sectoral shape, the observation of image is not so easy, compared to a rectangular or trapezoidal B-mode image obtained by the linear scan.

Under the circumstance, in order to obtain a B-mode display image by linear scan which can be easily observed, the inventor has studied the D-mode display obtained by a linear scan which is performed at desired deflection angles by using a linear scan probe.

In an ultrasonic diagnostic apparatus devised in this study, a deflection angle setting dial is mounted on a console. By rotating the dial in one or the other direction, the deflection angle can be set. Also, the console is provided with sample point setting means for setting sample points. Both a linear scan for normal B-mode display and a scan for the PWD-mode display at desired deflection angles are performed for each ultrasonic raster. Thus, B-mode display data and PWD-mode display data are obtained.

It has been found that the ultrasonic diagnostic apparatus for obtaining D-mode display data with use of a linear scan probe by carrying out an oblique linear scan at desired deflection angles has the following disadvantages.

Namely, the oblique linear scan can be realized by the selection of a group of transducers (e.g., selection of the diameter of each transducer) employed in an ultrasonic transmission/reception system, and the setting of a delay level in each transducer. The setting of sample points is carried out by a Doppler signal processing system. Thus, if a deflection angle and sample points are set at first and this deflection angle is then changed to obtain bloodstream data or PWD-mode data based on ultrasonic beams in a different direction, the positions of sample points in an ultrasonic propagation space would change. This is because the sample points are set based on the beam propagation distance from the ultrasonic transmission/reception points.

FIG. 1 shows the change in position of sample points. A pulse Doppler simultaneous driving transducers group (SDTG) is fixed. At first, suppose that an ultrasonic wave is transmitted/received from/by the transducers group at an deflection angle of $\theta 1$ ($\theta 1 = 90°$) and a sample point SP1 is located at an ultrasonic propagation distance d. Then, if an ultrasonic beam is propagated from the same transducers group (SDTG) at an angle of $\theta 2$, the sample point SP1 is changed to a sample point SP2, since the ultrasonic propagation distance d is unchanged. Similarly, if an ultrasonic beam is propagated from the same transducers group at an angle of $\theta 3$, the sample point SP2 is changed to a sample point SP3 since the ultrasonic propagation distance is unchanged.

Thus, the PWD-mode display image (bloodstream velocity data), obtained along with the B-mode display image, varies in accordance with the deflection angles. As a result, exact diagnosis cannot be carried out. In order to avoid this drawback, the resetting of sample points is required so that the sample points can be located at the same position, resulting in troublesome operation.

The inventors have developed a technique for high-precision and easy diagnosis, wherein, even if deflection angles change, PWD-mode data or bloodstream velocity data corresponding to the same position can automatically be obtained in the linear-scan PWD-mode display.

FIG. 2 shows this technique. When a deflection angle $\theta 2 = 90°$, a sample point is set at a position d (corresponding to the ultrasonic propagation distance). Even if the deflection angle is changed, the sample point can be set at the same position if a sample point on a beam propagation path at a given angle $\theta 1$ is set to $d/\cos \alpha$. It is understood that the transducers group may be displayed by $d \cdot \tan \alpha$ (transducer selection control).

Figure 3:
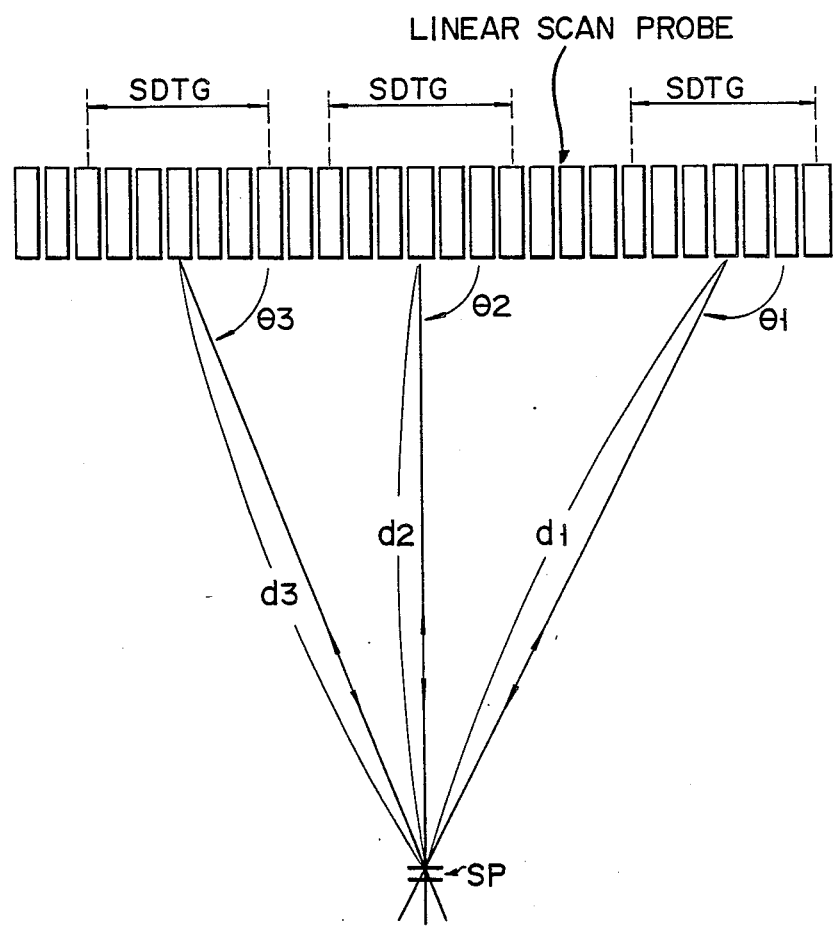
FIG. 3 shows changes in deflection angle of ultrasonic beams and propagation paths when sample points are fixed in a linear scan.

As shown in FIG. 3, PWD-mode data or bloodstream data corresponding to the same sample point SP existing in an ultrasonic propagation space can be obtained at given deflection angles $\theta 1$ (beam propagation distance d1), $\theta 2$ (beam propagation distance d2) and $\theta 3$ (beam propagation distance d3).

According to this technique, the PWD-mode data or bloodstream data, obtained along with the B-mode image, corresponds to the sample point SP even if the deflection angle of ultrasonic beam is changed. Thus, exact diagnosis can be realized. In addition, an operation for resetting the sample point when the deflection angle is changed is not necessary, and the operability of the apparatus can be improved.

One embodiment of an ultrasonic diagnostic apparatus of the present invention, which can carry out the above technique, will now be described with reference to FIG. 4.

A linear scan probe 10, which has an array of small-box-shaped ultrasonic transducers corresponding to N-channels, as shown in FIG. 1, is placed in contact with the surface of a subject (not shown). When ultrasonic beams are propagated from the linear scan probe 10, the linear scan probe 10 is driven by an ultrasonic transmitting system 20. On the other hand, when the propagated beams are received by the linear scan probe 10, the linear scan probe 10 is driven by an ultrasonic receiving system 30.

The ultrasonic transmitting system 20 comprises a transmitting/receiving transducer change-over switch 22 for selecting the transmission/reception mode of the linear scan probe 10, an n (<N)-channel pulser 24 for applying driving pulses to the transducers selected for transmission mode by the switch 22, and a transmitting delay controller 26 for delaying the application timing of driving pulses in accordance with the diameter, deflection angle and focus depth of each ultrasonic beam.

The ultrasonic receiving system 30 comprises an n-channel preamplifier for amplifying reflection-wave echo signals received by the transducers of the linear probe 10 selected by the switch 22, an n-channel receiving delay line 34 for delaying and summing amplified signals output from the preamplifier 32 in accordance with the diameter, deflection angle and focus depth of the beams received by the transducers, and a receiving delay controller 36 for supplying delay data to the receiving delay line 34.

A system control circuit 40 controls the transmitting delay controller 26 of the ultrasonic transmitting system 20 and the receiving delay controller 36 of the ultrasonic receiving system 30. The system control circuit 40 sets the transmitting delay time and receiving delay time corresponding to the diameter, deflection angle and focus depth of the beams and the generation of ultrasonic rates related to transmission/reception timing, on the basis of sample points determined in a PWD-mode processing system 60 (described later).

Figure 4:
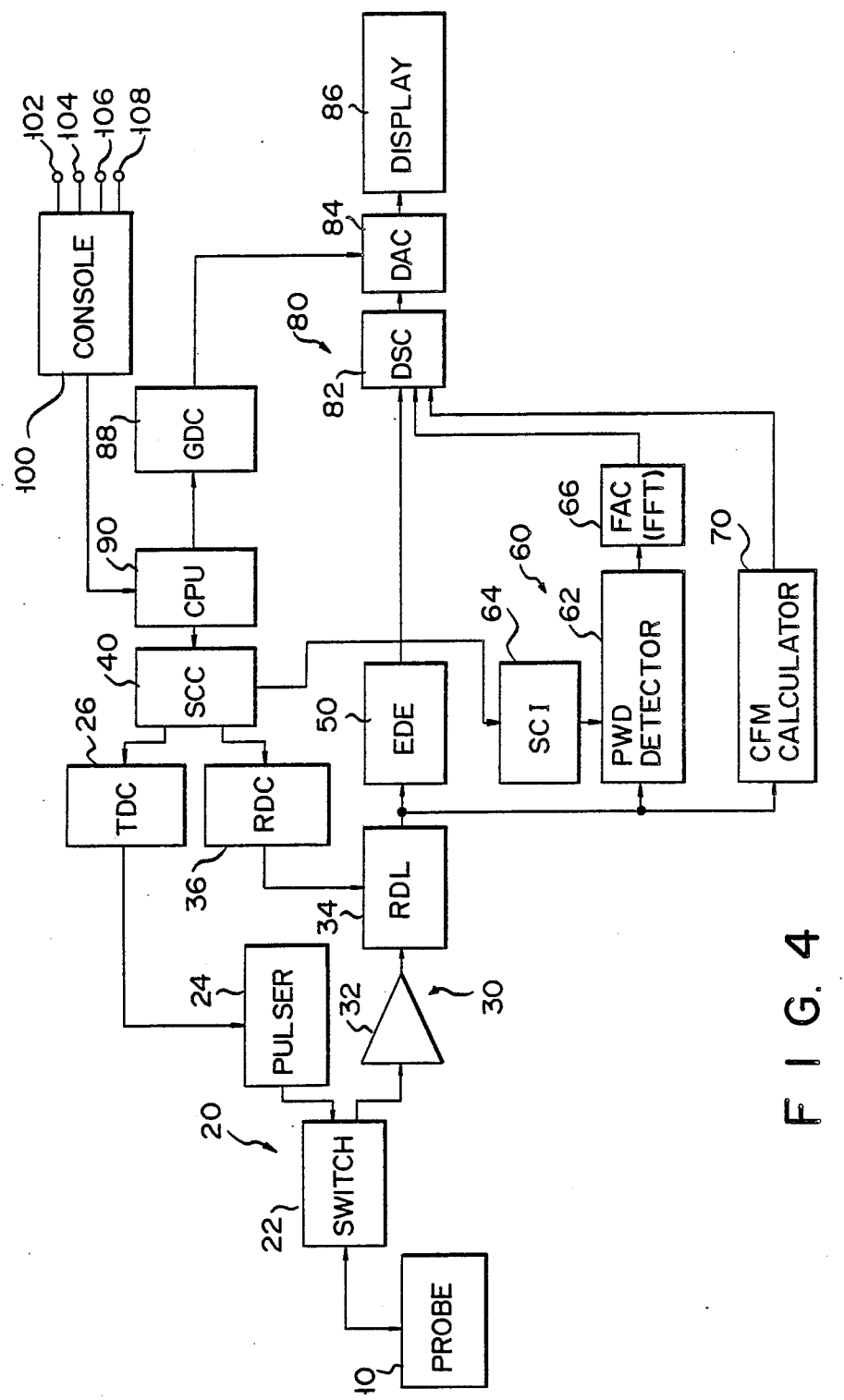
FIG. 4 shows a structure of an embodiment of an electronic linear scan type ultrasonic diagnostic apparatus according to the present invention.

A B-mode image detection system of the apparatus shown in FIG. 4 includes an envelope detector 50 for detecting the envelope of a summed echo signal.

The D-mode (PWD-mode) processing system 60 comprises a pulse Dopper detector 62 for phase-detecting the summed echo data relating to a Doppler-mode ultrasonic receiving signal and obtaining a Doppler signal corresponding to a sample point (described later) on the basis of the detection output, a sampling circuit 64, and a frequency analyzing circuit 66 for subjecting the output of the pulse Doppler detector 62 to a frequency analysis using a fast-Fourier transform (FFT) thereby to obtain bloodstream velocity data.

A CFM calculator 70 serving as a DF-mode processor, for example, in a correlation system, produces CFM image data which is obtained by scanning a specific region several times. Based on the correlation of the resulting receiving signals, the CFM image data or a profile (direction of bloodstream, average flow velocity, flow velocity distribution, power in bloodstream direction, etc.) of a bloodstream is displayed by means of levels of brightness, hue and tone.

A display system 80 comprises a DSC (digital scan converter) 82, a DAC (digital/analog converter) for converting an output from the DSC 82 to an analog signal, and a TV monitor 86 for displaying an image in a standard TV scan mode by adding a control signal to an output from the D/A converter 84. In the digital scan converter 82, the detection data from the envelope detector 50, the bloodstream velocity data from the Doppler mode processing system 60 and the output from the CFM calculator 70 are stored for each corresponding ultrasonic raster, and a plurality of ultrasonic rasters having B-mode image data, bloodstream velocity data and CFM data are produced, thus forming an ultrasonic image of each frame and converting the formed image to a standard TV scan signal.

The data write in the DSC 82 is controlled by the system control circuit 40. As mentioned above, the system control circuit 40 receives a command from a CPU 90 to delay sampled received signals. The CPU 90 is driven by a console 100 having a scan mode setter 102, a deflection angle setter 104, a sample point setter 106 and a focus setter 108. Each of the scan mode setter 102, deflection angle setter 104, sample point setter 106 and focus setter 108 is composed of a plurality of switches and dials. The CPU 90 delivers a command to a GDC (graphic display controller) 88 so that a marker indicating a sample point set by the console 100, etc. are produced in the GDC 88. The marker, etc. are added to the output of the DSC 82.

Based on the above-described principle of sample point setting, the control system including the console 100, CPU 90 and system control circuit 40 makes it possible to carry out, in the B-mode and DF-mode display, a normal linear scan (deflection angle $\theta = 90°$) and an oblique scan at a desired deflection angle $\theta$ set by the deflection angle setter 104 of console 100. Also, in the D-mode display, a desired deflection angle $\theta$ can be set by the deflection angle setter 104 of the console 100. The sample point setter 106 of the console 100 allows the setting of a sample point at a desired position. The focus setter 108 of the console 100 can set a single-stage focus or multi-stage foci at desired depths in the B-mode display, DF-mode display and D-mode display.

In this case, as shown in FIG. 3, the position of the sample point is fixed, and the transducers group and the deflection angles of the ultrasonic beams are set so that the beams can be rotated about the fixed position of the sample point.

Figure 5:
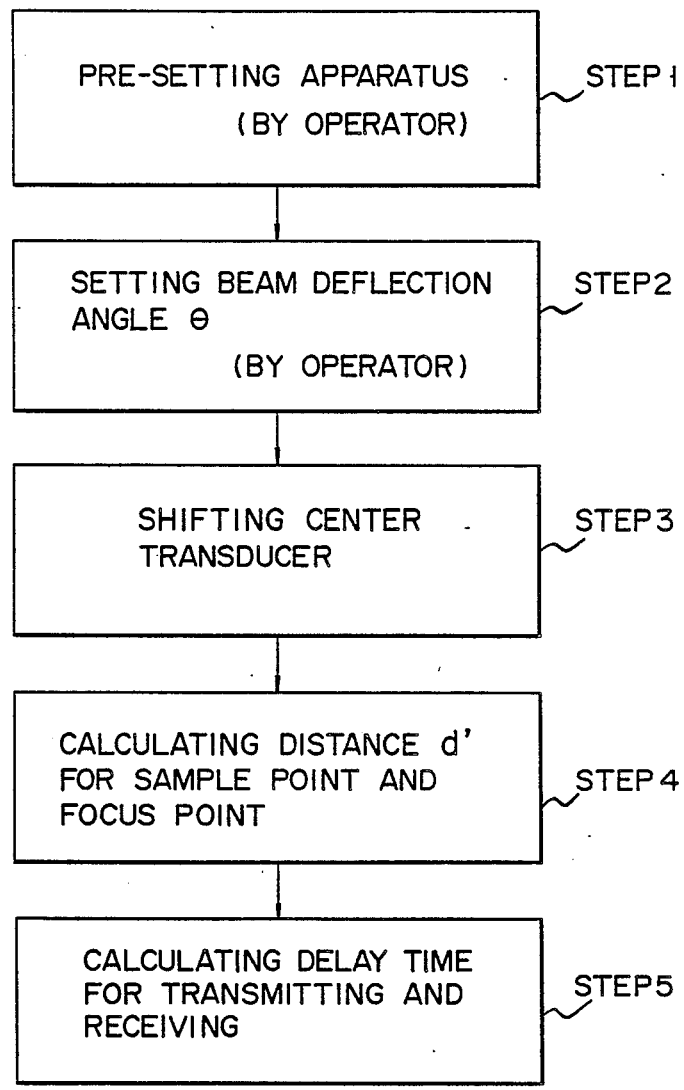
FIG. 5 is a flow chart showing the operational procedures of the ultrasonic diagnostic apparatus shown in FIG. 4.

The operation of the above embodiment will now be described. As shown in FIG. 5, in STEP 1, the operator operates a preset switch mounted on the console 100 to initialize the apparatus.

Figure 6A:
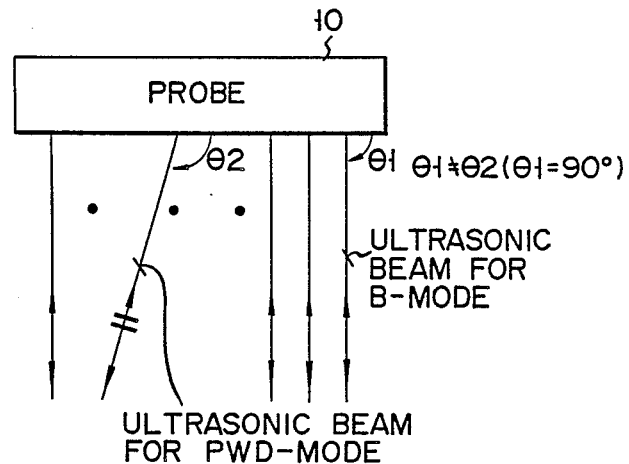

In STEP 2, the deflection angle $\theta$ is set by the deflection angle setter 104. For example, the depth of a single-stage focus is set near a position SP in FIG. 6A and similarly the position of the sample point is set at SP. In the B-mode, the deflection angle is sets to a normal value of 90°. In the D-mode, the deflection angle is set to a desired value by the deflection angle setter 104. Thus, the focus and sample point are fixed at SP.

In STEP 3, the CPU 90 performs arithmetic operations to find an ultrasonic propagation path under the condition of the deflection angle $\theta$. That is, the CPU 90 finds the position of an equivalent sound source of probe 10 where an ultrasonic beam propagating at the angle $\theta$ intersects the surface of the central transducer of probe 10. The source of the current beam is shifted to the found position.

As shown in FIG. 2, where the symbol $e_c'$ denotes the position to which the central transducer in the probe 10 is to be shifted, $e_c$ denotes the position of the central transducer in the probe 10, d denotes the distance between the position $e_c$ and the sample point SP, d' indicates the distance between the position $e_c'$ and SP, and $\alpha$ indicates an angle between a line representing distance d and a line representing distance d', the following relationship can be established:

$$e_c' = e_c - d \tan \alpha, \quad d' = d/\cos \alpha$$

In STEP 4, the CPU 90 finds the distance d' of the beam propagation path formed at the deflection angle $\theta$ calculated in STEP 3. Based on the substrate d', the sample point and focus point under the condition of the deflection angle $\theta$.

In STEP 5, at least one of the transmitting and receiving delay times is calculated for attaining the deflection angle and the focus point to be set based on the fixed sample point SP. A signal corresponding to the calculated delay time is supplied to the system control circuit 40 to control the transmitting delay controller 26 and receiving delay controller 36. Thus, the ultrasonic beam having the deflection angle and focus point set based on the fixed sample point SP is transmitted/received through the probe 10. In this case, the delay time $\tau i$ is given by the following equation:

$$\tau i = \frac{(i-1)d' \cos \alpha}{c} + \frac{(i-1)^2 a^2}{8cd' \cos \alpha}$$

(where a indicates the pitch of transducers, and c denotes a sonic velocity)

In addition to the above operation, a B-mode scan is carried at the deflection angle $\theta$ set based on the selection control and the delay control of the transducers group. In the B-mode, a normal scan is carried out. Thus, as shown in FIG. 3, the PWD data (or bloodstream velocity data) corresponding to the position SP can be obtained at the freely selected deflection angle $\theta$ (beam propagation distances are d1, d2 and d3).

FIGS. 7A to 7F are timing charts showing the operation of the ultrasonic diagnostic apparatus. FIG. 7A is a timing chart of rate pulses, wherein one pulse indicates a single receiving operation of an ultrasonic beam. FIG. 7B is a timing chart of raster addresses, wherein numerals 0, 1, 2 . . . denote ultrasonic raster numbers and D denotes a D-mode raster. FIG. 7C is a timing chart of B-mode sampling times, wherein numerals 0, 1, 2 . . . denote B-mode ultrasonic rasters. FIG. 7D is a timing chart for data input for CFM arithmetic operation processing (DF-mode), wherein the data input timing for producing BDF-mode ultrasonic rasters 0, 1, 2 . . . is shown. FIG. 7E is a timing chart for data output for CFM arithmetic operation processing (DF-mode), wherein the data output timing for producing BDF-mode rasters 0, 1 . . . is shown. FIG. 7F is a timing chart of sampling times for PWD-mode (D-mode) display.

As described above, the PWD data or bloodstream velocity data, obtained along with the B-mode image, is obtained from the fixed sampling point SP which is unchanged even if the deflection angle is changed. Thus, exact and reliable diagnosis can be realized. In addition, the conventional step of resetting the sample point each time the deflection angle of beams is changed can be omitted. Only a single operation for setting the sample point is required.

Figure 6B:
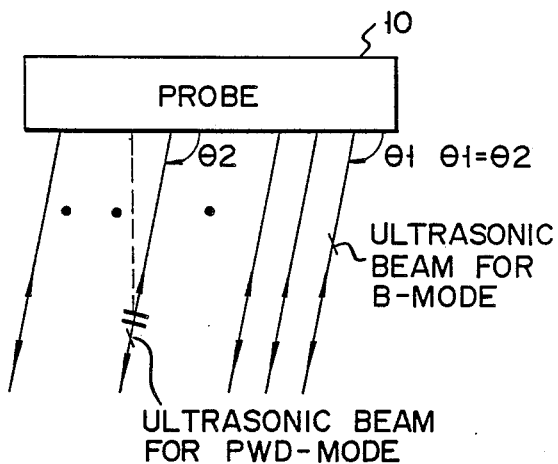
Figure 6C:
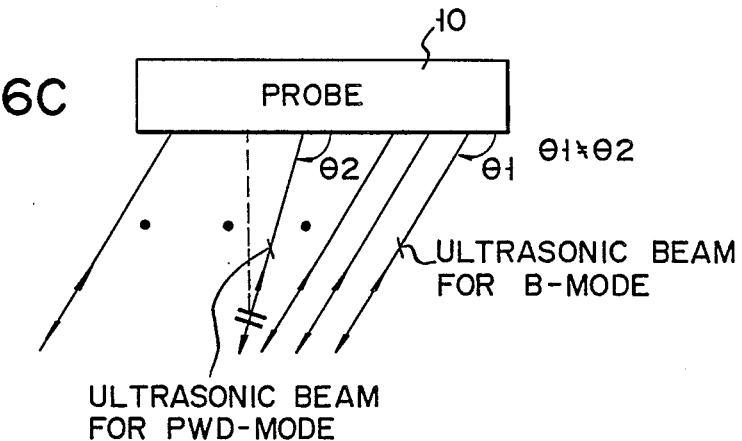

In the above description, it was stated that a normal scan with the deflection angle $\theta = 90°$ was carried out in the B-mode or BDF-mode. However, as shown in FIG. 6B, an oblique scan with the same angles $\theta 1$ and $\theta 2$ ($\theta 1 = \theta 2$) can be performed in the B-mode or BDF-mode, and in the D-mode. Alternatively, as shown in FIG. 6C, an oblique scan with different angles $\theta 1$ and $\theta 2$ ($\theta 1 \neq \theta 2$) can be carried out in the B-mode or BDF-mode, and in the D-mode.

Examples of the combination of scan modes will now be described. There are combinations such as a combination of a B-mode oblique linear scan and a D-mode oblique scan, a combination of a B-mode linear scan and a D-mode oblique scan, a combination of a B-mode oblique linear scan, a D-mode oblique scan and a D-mode oblique DF-mode scan, or a combination of a B-mode linear scan, a D-mode oblique scan and a D-mode oblique DF-mode scan. Here, a typical D-mode scan is a PWD-mode scan.

In the above embodiment, based on the set sample point, the ultrasonic transmitting/receiving system is controlled (transducer selection control including control of diameter of transducer; delay amount control; focus control). It is possible to carry out only the transducer selection control (including control of the diameter of transducer) and the delay amount control, and makes the focus control adjustable.

The ultrasonic diagnostic apparatus according to the above embodiment is provided with the deflection angle setter 104 for setting the deflection angle in the oblique linear scan and the sample point setter 106 for setting the sample point in the D-mode (PWD-mode). When the deflection angle is changed by the deflection angle setter 104, the position of the sample point in the subject is made to remain unchanged by carrying out at least one of the transducer section control (including control of transducer aperture), the delay amount control and the focus control in the oblique linear scan. Thus, with the initially set sample point being unchanged, the transducer selection control (including control of transducer aperture), delay amount control and/or focus control can be carried out to perform the oblique linear scan at a desired deflection angle in the D-mode (PWD-mode). Even if the deflection angle is changed, the PWD data or bloodstream velocity data at the fixed sample point can automatically be obtained. Thus, the operation of the apparatus is easy and high-precision diagnosis can be realized.

Figure 8A:
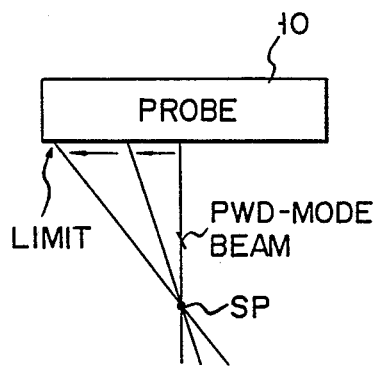
Figure 8B:
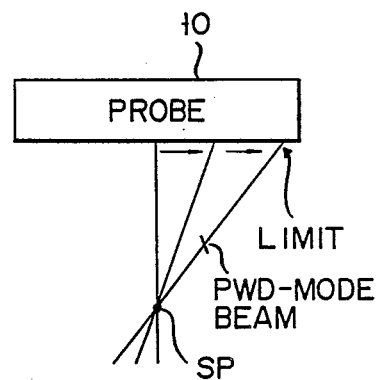
Figure 8C:
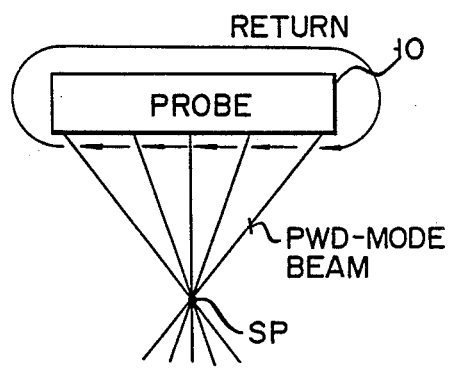
Figure 8D:
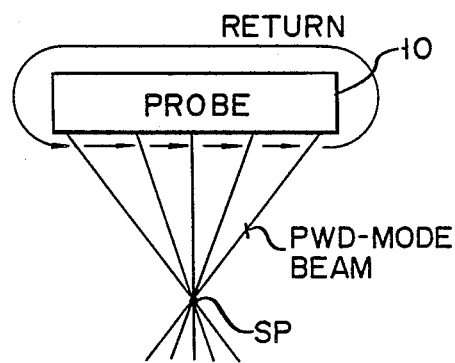

The deflection angle of the ultrasonic beam in the D-mode scan can be set, as shown in FIGS. 8A to 8D. In FIGS. 8A and 8B, the position of the beam is limited at both ends of the linear scan probe. In FIGS. 8C and 8D, the position of the beam at one end of the probe is returned to the position at the other end. The technique for limiting or returning the position of the beam can be realized by adding a limiter or a return setter to the deflection angle setter, or the CPU 90 is made to find, by calculation, the condition in which the equivalent sound source of the ultrasonic beam is located at the end of the linear scan probe.

Since plurality of deflection angles can be easily set by the deflection angle setter, an absolute bloodstream velocity value can be measured. The principle of this technique will now be described with reference to FIGS. 9 and 10.

Figure 9:
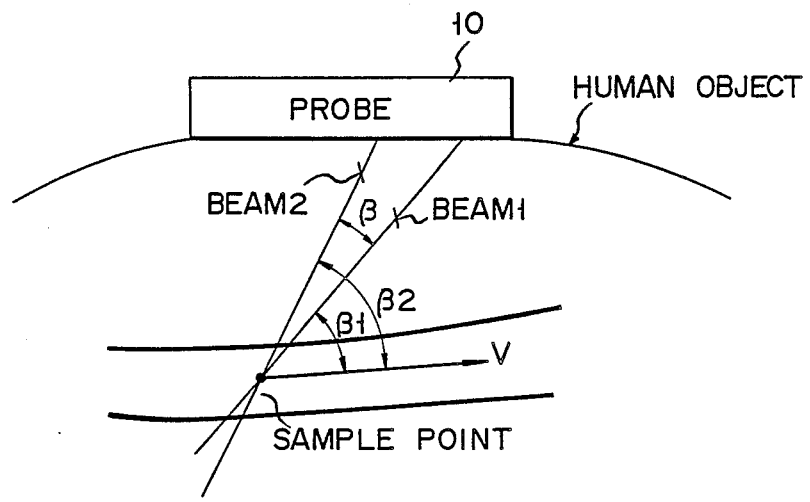
FIG. 9 shows a principle for measuring an absolute bloodstream velocity value by using two ultrasonic beams of different deflection angles.

As shown in FIG. 9, by operating the deflection angle setter, beams 1 and 2 are propagated/received at angles $\beta 1$ and $\beta 2$ in the D-mode. The beams 1 and 2 are alternately propagated/received in accordance with rate pulses.

The Doppler deviation frequency fd1 of beam 1 at the sample point is given by the following equation:

$$fd1 = \frac{2V \cos \beta_1}{c} \cdot fo$$

The Doppler deviation frequency df1 of beam 2 at the sample point is given by the following equation:

$$fd2 = \frac{2V \cos \beta_2}{c} \cdot fo$$

If $h=2fO$, $d1=h \, V \cos \beta 1$

Figure 10:
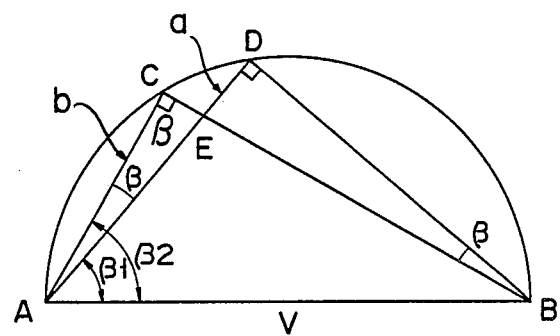
FIG. 10 geometrically shows the principle for measuring the absolute bloodstream velocity value.

In the case where $a=fd1/h$, and $b=fd2/h$, the relationship between V, a and b is shown in FIG. 10. In FIG. 10, $\triangle ACB$, $\triangle ACB$, $\triangle ACE$ and $\triangle ADE$ are right angles, and $$\overline{AE} = b/\cos \beta, \quad \overline{DE} = a - b/\cos \beta$$

$$\overline{DE} = \overline{DE}/\tan \beta = (a = b/\cos \beta)/\tan \beta$$
$$= a \cot \beta - b/\sin \beta$$

Thus, from the relationship between $\triangle ADB$ and $$\overline{AB^2} = \overline{AD^2} + \overline{DB^2}, \quad V = \sqrt{a^2 + \left(a \cot \beta - \frac{b}{\sin \beta}\right)^2}$$

$$\frac{1}{h} \cdot \sqrt{fd_1^2 + \left(fd_1 \cot \beta - \frac{fd_2}{\sin \beta}\right)^2} =$$

$$\frac{c}{2fo} \sqrt{fd_1^2 + \left(fd_1 \cot \beta - \frac{fd_2}{\sin \beta}\right)^2}$$

An apparatus embodying the above principle is shown in FIGS. 11A and 11B.

In FIG. 11A, output signals from a PWD detector 72 a supplied to a frequency analyzer 77-1 for finding the Doppler deviation frequency fd1 of beam 1 at the sample point 1 and a frequency analyzer 77-2 for finding the values of the Doppler deviation frequency fd2 of beam 2 at the sample point. The values of the frequencies fd1 and fd2 obtained by the frequency analyzers 77-1 and 77-2 are sent to an absolute bloodstream velocity calculator 78 to calculate the absolute bloodstream velocity value V.

In FIG. 11B, output signals of the PWD detector 72, which correspond to beams 1 and 2, are alternately supplied to a frequency analyzer 77 to find the Doppler deviation frequencies fd1 and fd2. The values of these frequencies are stored in memories 79-1 and 79-2. The values of the frequencies fd1 and fd2 are read out from the memories 79-1 and 79-2 and delivered to the absolute bloodstream velocity calculator 78, thereby to obtain the absolute bloodstream velocity value V.

As described above, in the present invention at least one of the transducer selection control (including control of transducer aperture), delay amount control and focus control is performed to keep the position of a sample point in a living body constant. Thus, even if the deflection angle of an ultrasonic beam is changed, the PWD data or bloodstream velocity data corresponding to the same fixed sample point can automatically be obtained. Therefore, the operation of the apparatus is easy, and high-precision diagnosis can be realized.

Other changes and modifications can be made to the present invention within the scope of the subject matter of this invention.

What is claimed is:

1. An ultrasonic diagnostic apparatus, comprising:
   transmitting/receiving means for transmitting/receiving a linear scan of ultrasonic beams to/from a subject through a linear scan probe;
   sample point setting means for setting a sample point at a desired position in said subject at a specified distance along a propagation path line of an ultrasonic beam transmitted from a specified location on said probe at a deflection angle having a first value relative to said probe and for directing the ultrasonic beam to the sample point;
   deflection angle setting means for changing the deflection angle to a second value;
   changing means responsive to a change in the value of the deflection angle for controlling said transmitting/receiving means to transmit a new ultrasonic beam at the second deflection angle value so as to intersect the sample point and for changing the specified location along the propagation path line of said new ultrasonic beam so as to maintain the sample point position in the subject upon each changing of the deflection angle; and
   imaging means comprising a D-mode processor for frequency-analyzing a received signal corresponding to said sample point for calculating bloodstream velocity data of said subject based upon a Doppler deviation frequency derived from said signal.

2. The apparatus according to claim 1, wherein said D-mode processor comprises:
   a first frequency analyzer for frequency-analyzing a received signal of an ultrasonic beam propagated at the first deflection angle value, which is obtained at the sample point fixed in the subject, to obtain a first Doppler deviation frequency;
   a second frequency analyzer for frequency-analyzing a received signal of said ultrasonic beam having said second deflection angle value, which is obtained at the sample point fixed in the subject, to obtain a second Doppler deviation frequency; and
   signal processing means for calculating a bloodstream velocity data on the basis of the first Doppler deviation frequency obtained by the first frequency analyzer and the second Doppler deviation frequency obtained by the second frequency analyzer.

3. The apparatus according to claim 1, wherein said D-mode processor comprises:
   a frequency analyzer for frequency-analyzing a received signal of said ultrasonic beam having said first deflection angle value, which is obtained at the sample point fixed in the subject, to obtain a first Doppler deviation frequency, and for frequency-analyzing a received signal of said new ultrasonic beam having the second deflection angle value, which is obtained at the sample point fixed in the subject, to obtain a second Doppler deviation frequency;
   first memory means for storing the first Doppler deviation frequency obtained by said frequency analyzer;

second memory means for storing the second Doppler deviation frequency obtained by said frequency analyzer; and signal processing means for calculating a bloodstream velocity data on the basis of the first Doppler deviation frequency stored in the first memory means and the second Doppler deviation frequency stored in the second memory means.

4. The apparatus according to claim 1, wherein said transmitting/receiving means includes means for performing a plurality of simple and compound scan modes including a D-mode scan, a B-mode scan, an M-mode scan, a D-mode/B-mode scan, and a D-mode/M-mode scan, and wherein said imaging means includes a digital scan converter, having a D-mode processor, a B-mode processor and an M-mode processor, for synthesizing ultrasonic images output from the D-mode processor, B-mode processor, and M-mode processor and converting the resulting synthesized image to a standard television image.

5. The apparatus according to claim 4, wherein said transmitting/receiving means includes means for alternately performing a D-mode ultrasonic transmitting/receiving operation and a B-mode ultrasonic transmitting/receiving operation in the D-mode/B-mode scan, and means for alternately performing a D-mode ultrasonic transmitting/receiving operation and an M-mode ultrasonic transmitting/receiving operation in the D-mode/M-mode scan.

6. The apparatus according to claim 1, wherein said transmitting/receiving means includes means for performing a plurality of simple and compound scan modes including a D-mode scan, a B-mode scan, an M-mode scan, a DF-mode scan, a D-mode/B-mode scan, a D-mode/M-mode scan, and a D-mode/DF-mode scan, and wherein said imaging means includes a digital scan converter, having a D-mode processor, a B-mode processor, an M-mode processor, and a DF-mode processor, for synthesizing ultrasonic images output from the D-mode processor, B-mode processor, M-mode processor and DF-mode processor and converting the resulting synthesized image to a standard television image.

7. The apparatus according to claim 6, wherein said transmitting/receiving means includes means for performing a D-mode ultrasonic transmitting/receiving operation and a B-mode ultrasonic transmitting/receiving operation in the D-mode/B-mode scan, and means for alternately performing a D-mode ultrasonic transmitting/receiving operation and an M-mode ultrasonic transmitting/receiving operation in the D-mode/M-mode scan, and means for alternately performing a D-mode ultrasonic transmitting/receiving operation and a DF-mode ultrasonic transmitting/receiving operation in the D-mode/DF-mode scan.

8. The apparatus according to claim 1, wherein said transmitting/receiving means comprises:

a probe having n-channel ultrasonic transducers;

transmitting means including n (<N)-channel transmission drive circuits for driving said ultrasonic transducers;

receiving means including n-channel reception drive circuits and a summing circuit for summing n-channel receiving signals;

switching means for selectively connecting the n-channel transmission drive circuits of said transmitting means and the n-channel reception drive circuits of said receiving means to n-channel ultrasonic transducers of said probe, which serve as a simultaneous driving transducers group in a linear scan;

transmitting delay means for supplying transmission timing delay data to the n-channel transmission drive circuits of said transmitting means; and receiving delay means for supplying reception timing delay data to the n-channel reception drive circuits of said receiving means.

9. The apparatus according to claim 1, wherein said deflection angle setting means includes means for locating an equivalent sound source of the ultrasonic beam within said probe when the deflection angle is changed.

10. The apparatus according to claim 1, wherein said deflection angle setting means includes means for limiting the location of said equivalent sound source when the location of the equivalent sound source has reached one end of said probe.

11. The apparatus according to claim 1, wherein said deflection angle setting means includes means for returning to the other end of said probe said equivalent sound source when the location of said equivalent sound source has reached one end of said probe.

12. The apparatus according to claim 1, wherein said transmitting/receiving means and said deflection angle setting means comprise means for effecting coincidence of the deflection angle in the D-mode scan with the deflection angle in other scan modes.

13. The apparatus according to claim 1, wherein said transmitting/receiving means and said deflection angle setting means are operable to separately set the deflection angle in the D-mode scan and the deflection angle in other scan modes.

14. The apparatus according to claim 1, wherein said transmitting/receiving means selectively provides one of a single-stage and a multi-stage foci of an ultrasonic beam at least in one of the transmitting/receiving operations.

15. The apparatus according to claim 8, wherein, in said transmitting/receiving means, the number of transducers in the simultaneous driving transducers group is changed in end portions of the probe from the other portion of the probe.

16. The apparatus according to claim 8, wherein, in said transmitting/receiving means, the number of transducers in the simultaneous driving transducers group is smaller in end portions of the probe than in the other portion of the probe.

17. An ultrasonic diagnostic apparatus comprising:

transmitting/receiving means for transmitting/receiving a linear scan of ultrasonic beam to/from a subject through a linear scan probe and for performing a plurality of simple and composite scan modes including a B-mode scan, an M-mode scan, a D-mode scan, a DF-mode scan, a D-mode/B-mode scan, a D-mode/M-mode scan, and a D-mode/DF-mode scan;

sample point setting means for setting a sample point at a desired position in said subject at a specified distance along a propagation path line of an ultrasonic beam transmitted from a specified location on said probe at a deflection angle having a first value relative to said probe and for directing the ultrasonic beam to the sample point;

deflection angle setting means for changing the deflection angle to a second value, wherein said deflection angle setting means is manually operable to change the deflection angle of the ultrasonic beam, and said deflection angle setting means includes means for locating an equivalent sound source of the ultrasonic beam within said probe when the deflection angle is changed, and returning to the other end of said probe said equivalent sound source when the location of said equivalent sound source has reached one end of said probe;

changing means responsive to a change in the value of the deflection angle for controlling said transmitting/receiving means to transmit a new ultrasonic beam at the second deflection angle value so as to intersect the sample point and for changing the specified location along the propagation path line of said new ultrasonic beam so as to maintain the sample point position in the subject upon each change of the deflection angle; and imaging means comprising a D-mode processor for frequency-analyzing a received signal corresponding to said sample point for calculating bloodstream velocity data of said subject based upon a Doppler deviation frequency derived from said signal.

18. An ultrasonic diagnostic apparatus comprising:

transmitting/receiving means for transmitting/receiving a linear scan of ultrasonic beam to/from a subject through a linear scan probe and for performing a plurality of simple and composite scan modes including a B-mode scan, an M-mode scan, a D-mode scan, a DF-mode scan, a D-mode/B-mode scan, a D-mode/M-mode scan, and a D-mode/DF-mode scan;

sample point setting means for setting a sample point at a desired position in said subject at a specified distance along a propagation path line of an ultrasonic beam transmitted from a specified location on said probe at a deflection angle having a first value relative to said probe and for directing the ultrasonic beam to the sample point;

deflection angle setting means for changing the deflection angle to a second value, wherein said deflection angle setting means is manually operable to change the deflection angle of the ultrasonic beam, and said deflection angle setting means includes means for locating an equivalent sound source of the ultrasonic beam within said probe when the deflection angle is changed, and returning to the other end of said probe said equivalent sound source when the location of said equivalent sound source has reached one end of said probe;

changing means responsive to a change in the value of the deflection angle for controlling said transmitting/receiving means to transmit a new ultrasonic beam at the second deflection angle value so as to intersect the sample point and for changing the specified location along the propagation path line of said new ultrasonic beam so as to maintain the sample point position in the subject upon each change of the deflection angle; and imaging means including a digital scan converter, having a B-mode processor, an M-mode processor, a D-mode processor, and a DF-mode processor, for synthesizing ultrasonic images output from the B-mode processor, M-mode processor, D-mode processor, and DF-mode processor and converting the resulting synthesized image to a standard television image, said D-mode processor comprising:

a frequency analyzer for frequency-analyzing a received signal of said ultrasonic beam having said first deflection angle value, which is obtained at the sample point fixed in the subject, to obtain a first Doppler deviation frequency, and for frequency-analyzing a received signal of the new ultrasonic beam having the second deflection angle value, which is obtained at the sample point fixed in the subject, to obtain a second Doppler deviation frequency;

first memory means for storing the first Doppler deviation frequency obtained by said frequency analyzer, second memory means for storing the second Doppler deviation frequency obtained by said frequency analyzer, and signal processing means for calculating a bloodstream velocity data on the basis of the first Doppler deviation frequency stored in the first memory means and the second Doppler television frequency stored in the second memory means.

* * * * *

UNITED STATES PATENT AND TRADEMARK OFFICE
CERTIFICATE OF CORRECTION

PATENT NO. : 4,972,838

DATED : November 27, 1990

INVENTOR(S) : Nobuo Yamazaki

It is certified that error appears in the above-identified patent and that said Letters Patent is hereby corrected as shown below:

In the Abstract, Line 21, change "doppler" to --Doppler--;

Column 1, Line 53, change "linear/scan" to --linear scan--;

Column 2, Line 9, change "linear/scan" to --linear scan--;

Column 2, Line 43, change "linear/scan" to --linear scan--;

Claim 17, Column 14, Line 50, change "beam" to --beams--;

Claim 18, Column 15, Line 24, change "beam" to --beams--;

UNITED STATES PATENT AND TRADEMARK OFFICE
CERTIFICATE OF CORRECTION

PATENT NO. : 4,972,838

DATED : November 27, 1990

INVENTOR(S) : Nobuo Yamazaki

It is certified that error appears in the above-identified patent and that said Letters Patent is hereby corrected as shown below:

Claim 18, Column 16, Line 42, change "television" to --deviation--.

Signed and Sealed this

Twenty-second Day of December, 1992

Attest:

DOUGLAS B. COMER

Attesting Officer

Acting Commissioner of Patents and Trademarks